United States Patent [19]
Suzuki et al.

[11] 3,763,698
[45] Oct. 9, 1973

[54] ROTATING OBJECT BREAKAGE TEST APPARATUS

[75] Inventors: Ikuo Suzuki, Chiryu; Tomoyasu Imai, Kariya, both of Japan

[73] Assignee: Toyoda Kobi Kabushiki Kaisha, Aichi-ken, Japan

[22] Filed: May 31, 1972

[21] Appl. No.: 258,356

[52] U.S. Cl. .................................................. 73/88 R
[51] Int. Cl. .............................................. G01n 3/00
[58] Field of Search ................................ 73/88 R, 90

[56] References Cited
UNITED STATES PATENTS
1,805,896   5/1931   Weinland .......................... 73/88 R
3,040,564   6/1962   Hoffmann .......................... 73/88 R Primary Examiner—Jerry W. Myracle
Attorney—Norman F. Oblon et al.

[57] ABSTRACT

Rotating object breakage test apparatus for testing the strength and recording the mode of breakage of a rotating object. The object is mounted upon a spindle supported by gas bearings and is located within a dark shelter. An electrical conductor connecting an electric source with an electric vibrator is fixed upon the object so that when the object is broken by the centrifugal force applied thereto, the conductor is also cut or broken in order to stop the electric supply to the vibrator. By detecting interruption of the electric supply, the exact instant of the breakage of the rotating object is recorded, whereby the strength of the rotating object is detected by recording the rotational speed thereof, while the mode of breakage thereof is recorded upon a photograph.

10 Claims, 5 Drawing Figures

ROTATING OBJECT BREAKAGE TEST APPARATUS

BACKGROUND OF THE INVENTION

The present invention relates generally to rotating object breakage test apparatus, and more particularly to an improved rotating object breakage test apparatus which effectuates testing the breakage strength of a rotating object and taking a picture of the breakage mode thereof.

Conventionally, in a test apparatus for testing the breakage of a rotating object, a switching wire connected to a detecting circuit is provided adjacent to the rotating object so that when the rotating object is broken by a centrifugal force placed thereon, the switching wire is consequently broken by the scattering pieces of the rotating object. When the switching wire is cut or broken, the detecting circuit produces an electric signal, whereby the instant of the breakage of the rotating object can be detected.

However, in the conventional apparatus, since the switching wire is provided at some distance from the rotating object and is elastically extensionable, the switching wire is not broken instantaneously when the rotating object is broken by the centrifugal force applied thereon. Therefore, a time difference exists between the breakages of the rotating object and the switching wire with the result that the exact instant of breakage of the rotating object cannot be accurately determined.

SUMMARY OF THE INVENTION

Accordingly, it is an object of the present invention to provide an improved rotating object breakage test apparatus wherein the precise moment of the breakage of the rotating object may be accurately determined.

Another object of the present invention is to provide an improved rotating object breakage test apparatus for testing the breakage strength of the rotating object and for photographing the breakage mode thereof.

Still another object of the present invention is to provide an improved rotating object breakage test apparatus wherein a spindle for supporting the rotating object is rotatably carried by gas bearings so that the true strength of the rotating object may be detected.

Yet another object of the present invention is to provide an improved rotating object breakage test apparatus having guards for protecting the spindle from damage even if the pieces of the broken rotating object impact against the guards.

The foregoing objectives are achieved according to this invention through the provision of a rotating object breakage test apparatus having an electric vibrator which is operably mounted upon a spindle supporting a rotating object which is connected to an electric source therefor by means of an electric conductor which is fixed to the outer periphery of the rotating object, so that when the rotating object is broken, the conductor is also instantaneously broken to interrupt the electric supply to the vibrator. A receiver for an electric signal from the vibrator can therefore detect the exact instant of breakage of the rotating object since the electric voltage in the circuit of the receiver is suddenly decreased when the rotating object and the conductor are destroyed. A spindle supporting the rotating object is mounted upon gas bearings, and the rotating object is encased within a guarded housing so as to protect the spindle from the scattering broken pieces of the rotating object.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENT

Figure 2:
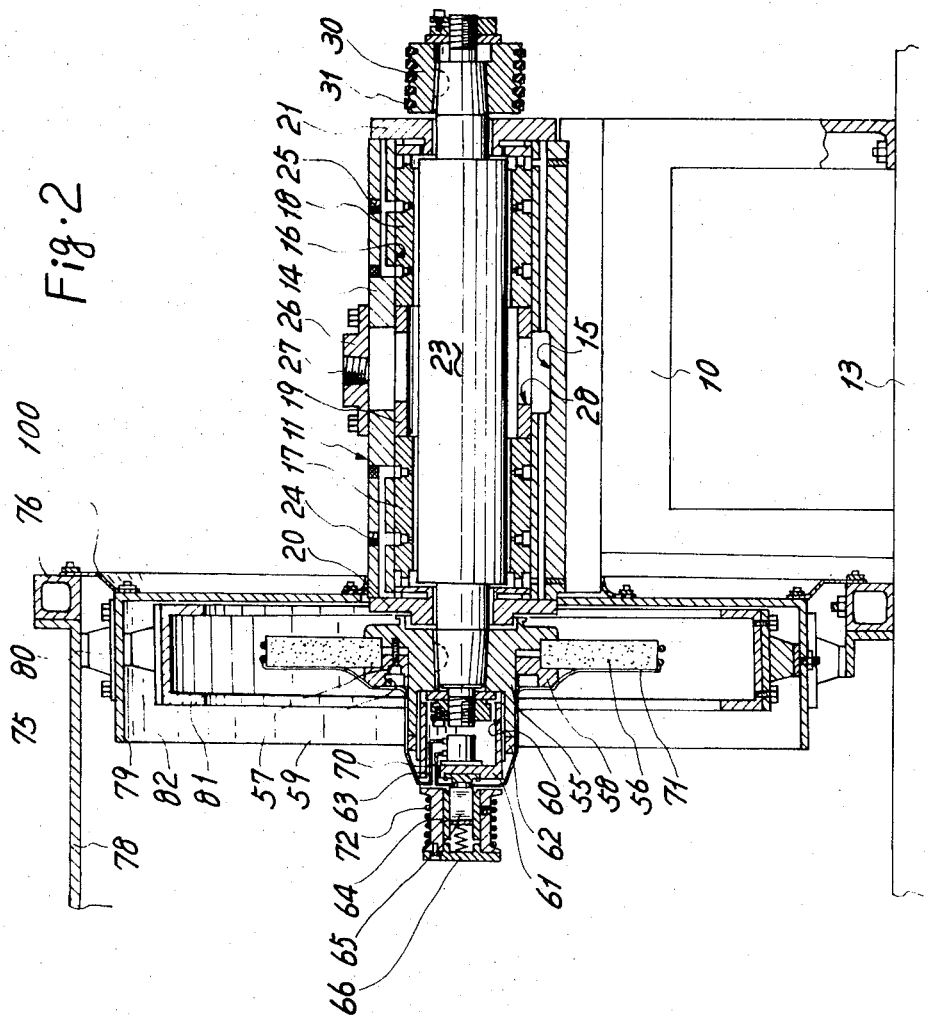
FIG. 2 is a sectional view of a rotating object breakage test apparatus showing a spindle device and guards for preventing the scattering of broken pieces of the rotating object.

Referring now to the drawings, and more particularly to FIG. 2 thereof, there is provided a cylindrical spindle device generally indicated by the reference character 11, having gas bearings and being supported upon a planar base 10 which is firmly fixed to a floor 13. A longitudinal, axially extending bore 16 is provided within a housing 14 of the spindle device 11 while a circumferential bore 15 is also provided centrally therein. Annular bearing members 17 and 18, made of various materials, such as, for example, any suitable metal, are disposed within the bore 16 with an annular spacing collar 19 disposed therebetween. In addition, annular thrust rings 20 and 21 are fixed to both ends of the housing 14 in order to sandwich the bearing members 17 and 18 and spacing collar 19 into their appropriate positions. The bearing members 17 and 18 are respectively provided with bores therein, through which the longitudinal, cylindrical spindle 23 is disposed and within which the spindle 23 is radially supported by pressurized gas, such as, for example, pressurized air, supplied to small clearances existing between the spindle 23 and the bores. Both ends of an enlarged portion of the spindle 23 are also faced with the thrust rings 20 and 21, a small clearance existing therebetween and into which pressurized gas is also supplied in order to axially support the spindle 23. Restrictors, such as orifices, are provided within conduits which open into the bearing surfaces of the bearing members 17 and 18 and thrust bearings 20 and 21. The conduits are in turn connected to supply ports 24 and 25 for supplying pressurized gas to the radial, and axial or thrust bearings created between the spindle 23 and the supporting members, that is, bearing members 17 and 18, and thrust rings 20 and 21. The pressurized gas supplied to the radial and axial or thrust bearings is exhausted through an exhaust port 27. By employing the gas bearings for supporting the spindle 23, the rotation thereof is smooth enough so as to avoid any vibration such as the vibration which normally occurs when conventional anti-friction bearings are used. The rotating object attached to the spindle 23 is therefore free from the vibration, and thus, is consequently broken simply because of the applied or centrifugal force. Therefore, the exact and true rotational speed of the breakage of the spindle 23 can be accurately detected. Furthermore, any type of object, that is, large or small in size, or heavy or light in weight, can be tested upon the apparatus according to the invention.

Figure 3:
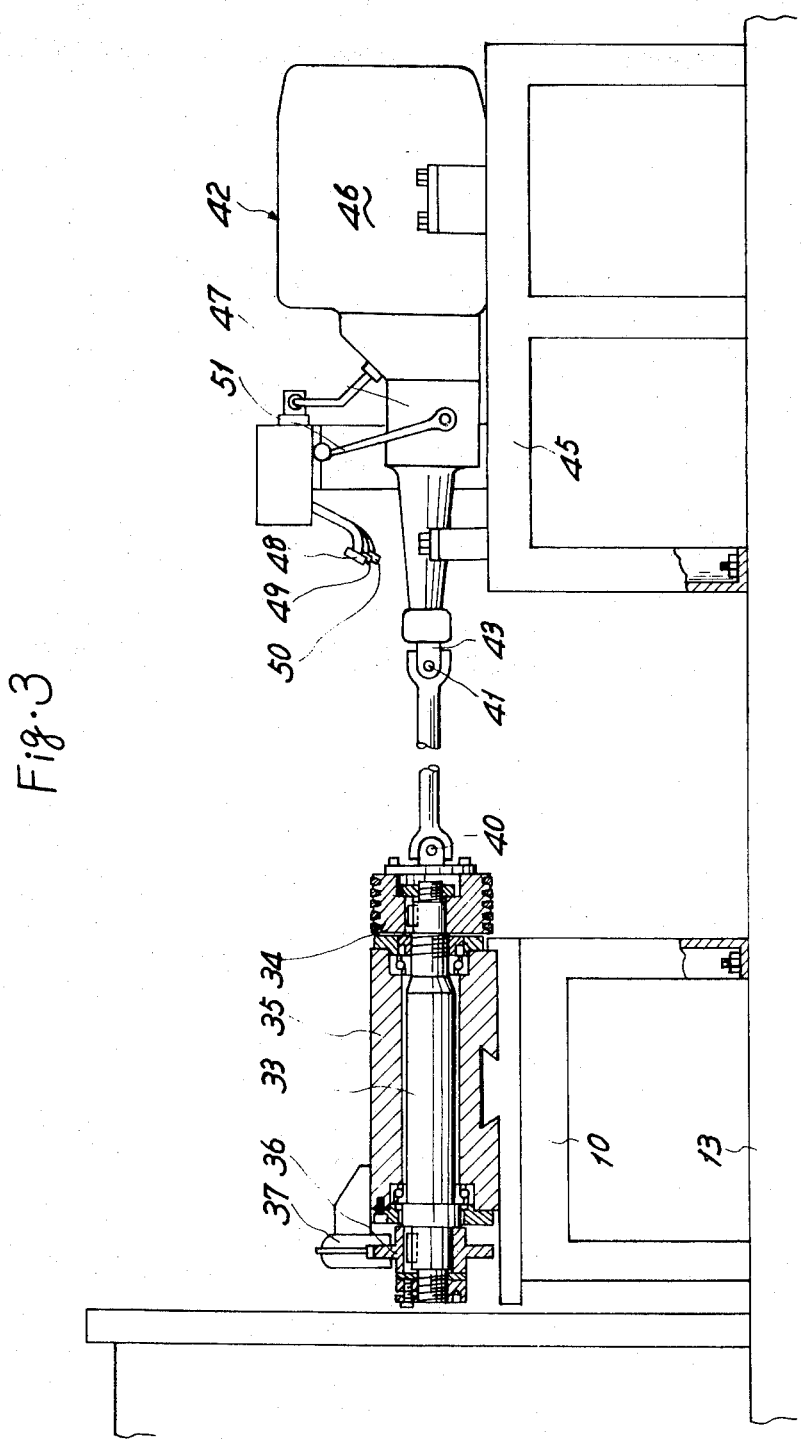
FIG. 3 is a view, partly in cross-section, showing a driving device of a rotating object breakage test apparatus.

Referring now to FIGS. 2 and 3, the spindle 23 extends axially through the thrust rings 20 and 21, and keyed to one extended end of the spindle 23 is a V-grooved pulley 30 which is connected to another pulley 34 (see FIG. 1) by means of V-belts 31. The pulley 34 is fixed to a longitudinal, cylindrical shaft 33 at one end thereof, shaft 33 being rotatably supported, within a tubular housing 35, through anti-friction bearings. The position of the housing 35 is changeable upon the base 10 so as to provide proper tension for the V-belts 31.

Referring now to FIG. 3, disc brake 37, for applying a braking force upon the shaft 33 through the disc 36 fixed to the shaft 33 at the other end thereof, that is, the end opposite that end to which pulley 34 is fixed, is mounted upon the housing 35. The disc brake 37 is somewhat conventional, and comprises a braking actuator operated by pressurized air and brake shoes operated by the braking actuator so as to clamp the disc 36. The braking cylinder is connected to the pressurized air source through a change-over valve which controls the direction of the pressurized air supplied thereto.

The shaft 33 is connected to an output shaft 43 of a motor 42 by means of universal joints 40 and 41. The motor 42 is mounted upon a planar pedestal 45 and consists of an internal combustion engine 46 and a transmission 47 for changing the rotational speed of the output shaft 43 by means of a control lever 51. Upon the motor 42, control pedals, such as, for example, accelerator pedal 48, clutch pedal 50 and change-over pedal 49, for controlling the change-over valve of the disc brake 37, are provided.

Internal combustion engine 46 is of the automobile type and is employed in this particular case for the motor 42 since enough power is obtained thereby, and the attached transmission 47 may control the speed of the output shaft 43 at large. Furthermore, the speed thereof can also be decreased rapidly by using so-called engine braking at a required time, such as, for example, when the rotating object is destroyed.

Referring now to FIG. 2, it is seen that at the other end of the spindle 23, there is provided a tubular sleeve 55, upon which the rotating object, such as, for example, a disc-shaped grinding wheel 56, is mounted by means of an annular clamping flange 58. It is noted that the rotating object is hereinafter referred to as the grinding wheel 56, although such object is, of course, not limited thereto. Similarly, there is provided an annular groove 59 upon the clamping flange 58 so that balancing pieces for balancing the rotating objects, such as, for example, the grinding wheel 56, may be mounted. The balancing pieces are not generally automatically disengageable from the clamping flange 58.

Figure 4:
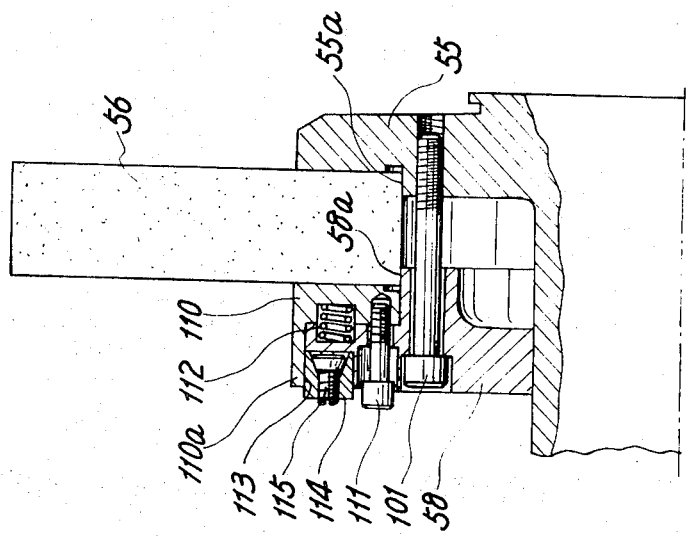
FIG. 4 is an enlarged fragmentary sectional view showing balancing pieces for the rotating object of the rotating object breakage test apparatus; and, FIG. 5 is an enlarged fragmentary sectional view showing another embodiment of balancing pieces for the rotating object of the rotating object breakage test apparatus.

Referring now to FIG. 4, there is shown another embodiment in which the balancing pieces are disengageable automatically from the clamping flange 58 so as to prevent the spindle 23 from damage when the grinding wheel 56 is broken. When the grinding wheel 56 is loaded upon the sleeve 55, the positions of plural pairs of balancing pieces 104 and 105 are adjusted such that the grinding wheel 56 is rotatably balanced. However, the assembly of the spindle 23 and its associated members are primarily made in balanced condition and therefore, when the grinding wheel 56 is broken and the pieces thereof scatter away from the sleeve 55, the spindle 23 and its associated members are suddenly unbalanced by the presence of the balancing pieces resulting in the fact that the spindle 23 and the bearing members 17 and 18 contact each other so as to cause serious damage in the instance that the spindle 23 is rotated at a high speed and the grinding wheel 56 was seriously unbalanced.

The sleeve 55 and the clamping flange 58 are respectively provided with engaging portions 55a and 58a for supporting the grinding wheel 56, portions 55a and 58a facing each other. An annular movable flange 102 is slidably mounted upon the engaging portion 58a and is threadingly engaged with a plurality of axially aligned bolts 107 which are received within the clamping flange 58 so as to regulate the movable range of the movable flange 102. The grinding wheel 56 thus is sandwiched between the sleeve 55 and the movable flange 102 by additional, axially aligned, bolt screws 101.

In addition, the clamping flange 58 has a circumferential, radially inclined notch which provides one circumferential groove 103 in cooperation with the movable flange 102. Since the notch is radially inclined, the groove 103 narrows in cross section toward the outer peripheries of the flanges 58 and 102.

A balancing piece has the same shape as the groove 103 in cross section and is centrally bored for the reception of a screw 106, the balancing piece therefore being divided into a pair of pieces 104 and 105. The balancing pieces 104 and 105 and the screw 106 are loaded at a proper position with respect to the flanges 58 and 102, and thereafter, the screw 106 is turned so as to move the balancing pieces 104 and 105 toward the outer periphery so that the balancing pieces 104 and 105 are firmly fixed within the groove 103 and the system is compressionally loaded. Normally, several pairs of the balancing pieces are used for obtaining the balanced condition, such being appropriately positioned around the periphery of the flange member 58.

In this arrangement, upon the grinding wheel 56 being broken, the movable flange 102 is shifted toward the right under the influence of the compressional loading, to disengage the balancing pieces 104 and 105 from the flanges 58 and 102, as the centrifugal force is applied thereto. Therefore, the balanced condition is maintained upon the spindle 23 so as not to cause damage thereto.

Figure 5:
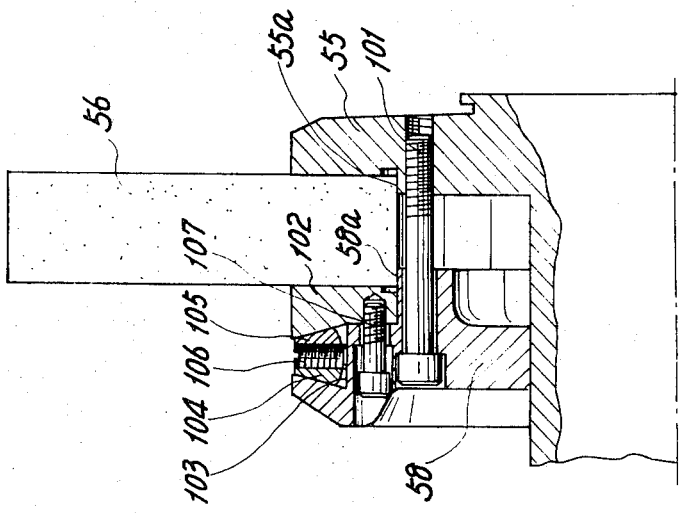

Referring now to FIG. 5, another embodiment of the balancing pieces is disclosed. In this embodiment, the balancing pieces are disengaged away from the flanges by the force of compressed springs instead of the centrifugal force. The clamping flange 58 and the sleeve 55 are respectively provided with engaging portions 58a and 55a. A movable flange 110 is slidably mounted upon the engaging portion 58a and is threadingly engaged with axially aligned screw bolts 111 which are received within the clamping flange 58 so as to regulate the rightward movement of the movable flange 110 per engagement with the head portions of the bolts. A plurality of compression coil springs 112 are interposed between the clamping flange 58 and the movable flange 110 for shifting the flange 110 toward the right when the grinding wheel 56 is broken. Upon the periphery of the clamping flange 58, there is arranged a circumferential notch which provides a circumferential groove 113. An annular extended portion 110a of the movable flange 110 defines with flange 58 and the groove 113 a housing for a plurality of balancing pieces 114. An axially aligned screw 115 which has a tapered frusto-conical head is threadingly engaged with each of the balancing pieces 114.

When the screw 115 is turned in one direction, the balancing piece 114 is somewhat expanded by means of the tapered head of the screw 115 so as to fix the balancing piece 114 within the groove 113 at a proper position. When the grinding wheel 56 is subsequently broken, the movable flange 110 is shifted toward the right by means of the compressed springs 112, and the balancing pieces are thus disengaged away from the flanges 58 and 110. Therefore, the balancing condition is maintained upon the spindle 23 to avoid damage thereto.

Referring now to FIG. 2, it is seen that at the left extended portion of the sleeve 55, there is provided an annular threaded portion 60 with which a radially aligned support member 61 is threadingly engaged at the left end thereof. A nut 62 is further engaged with the support member 61 so as to threadingly lock the member 61 to the sleeve 55. An electric vibrator 63, which provides an electrical wave of a predetermined frequency, is fixedly mounted upon the supporting member 61. An electric source, such as, for example, an electric power cell 65, is disposed within an annular member 64 which is made of electrically insulating material, and is threadingly engaged with the supporting member 61. The electric cell 65 is prevented from disengagement with supporting member 61 upon the rotation of the spindle 23 by a compression spring and a cover 66 fixed to the supporting member 61.

One electrode of the cell 65 is connected to one electric terminal of the vibrator 63, while another electrode thereof is connected to a second electric terminal of vibrator 63 through a conductor 71 which is wound upon the outer periphery of the grinding wheel 56 so that the conductor 71 is also cut or broken at the breakage of the grinding wheel, whereupon the electric wave generation by the vibrator 63 will be terminated. The conductor 71 may be an electrically conductive wire covered by electrical insulating material, and in case the grinding wheel 56 is nonconductive, the part of the wire wound upon the outer periphery of the wheel is not necessarily covered with such insulating material. As an alternative, electrically conductive synthetic resin may be used, such being sprayed upon the outer face of the grinding wheel 56, the ends of which synthetic resin are respectively connected to the electrode of the cell 65 and the electric terminal of the vibrator 63. The conductor 71 is thus pasted upon the grinding wheel 56 and the sleeve 55 so that the conductor 71 may not be disengaged therefrom while the grinding wheel 56 is rotated. An antenna 72 for the electric vibrator 63 is provided, such being wound upon an extended portion of the supporting member 61.

Still referring to FIG. 2, an annular shelter member or housing 75 is provided in order to prevent the scattering of the broken pieces of the grinding wheel 56. An annular frame 76 of the shelter 75, to which tubular cover 78, for covering the top and the both sides thereof, is welded, is fixed to the floor 13. Within the shelter 75, there is positioned a first annular guard member 79 attached to the cover 78 by means of elastic members 80. Furthermore, a second annular guard member 81, concentric with and within guard 79, and surrounding the enclosing grinding wheel 56, is provided, such guard being fixed to guard 79 by means of elastic members 82. At the right or rear end, the first guard 79 and the frame 76 are connected via a relatively elastic member 100 which serves to shut off the entrance of any light. The left or front end is likewise covered by a thick curtain, whereby the inside of the shelter 75 is rendered totally dark. It is thus seen by this arrangement of the first and the second guards 79 and 81, that the spindle device 11 is not damaged even if the broken pieces of the grinding wheel 56 are caused to impact with the guards, since the guards 79 and 81 are all fixed, through the elastic members 80 and 82, to the floor 13, rather than to the spindle device 11.

Figure 1:
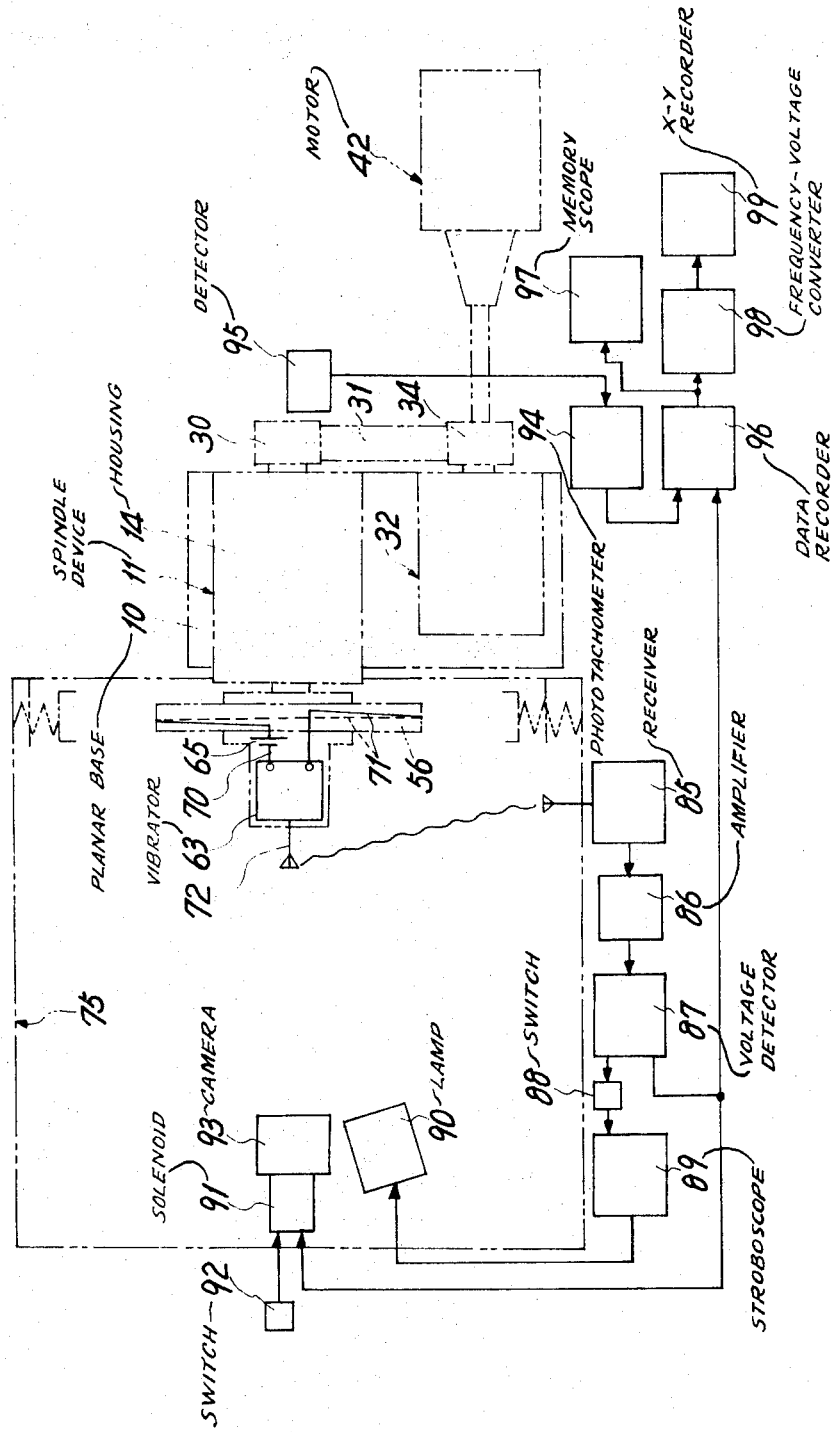
FIG. 1 is a schematic view of a rotating object breakage test apparatus constructed according to the present invention.

Referring now to FIG. 1, which discloses the arrangement of the recording or observing devices, a receiver 85 is provided to receive an electric signal from the vibrator 63. The signal is amplified by an amplifier 86 and supplied to a voltage detector 87. A stroboscope 89, for energizing a lamp 90 for a short moment, is operated by the voltage detector 87 through a switch 88. A solenoid 91, which is mechanically connected to a camera 93 positioned in front of the grinding wheel 56, is energized or de-energized by means of a switch 92 or the voltage detector 87.

A detector 95 detects the rotational speed of the spindle 23 and supplies the detected number of revolutions to a phototachometer 94 which provides electric pulses proportional in number to the number of revolutions of the spindle 23. A data recorder 96 is responsive to the phototachometer 94 and the voltage detector 87, so that the number of revolutions of the spindle 23, with respect to the time and the grinding wheel breakage signal from the voltage detector 87, are recorded on a memory medium such as a magnetic tape. A frequency-voltage converter 98 performs so as to produce an electric voltage proportional to the pulse number from the data recorder 96, and the electric voltage is further supplied to an X-Y recorder 99 which, in turn, records the number of revolutions of the spindle 23 with respect to time upon a visual medium, such as, for example, a sheet of paper, in a visual manner.

A memory scope 97 is further provided, such being connected to the data recorder 96 so as to visually sense the rotational change of the spindle 23, the memory scope being able to follow the exact rotational change of the spindle 23, since it does not have any mechanical moving parts as does the X-Y recorder 99. Except for the lamp 90, camera 93, and solenoid 91, the recording devices are located outside the shelter 75.

In operation, after the vibrator 63 generates a uniform electric wave, the engine 46 is started to rotate the spindle 23 and the grinding wheel 56. Thereafter, the switch 88 is turned on to electrically connect the voltage detector 87 with the stroboscope 89. To energize the solenoid 91, the switch 92 is turned on, and the shutter of the camera 93 is thus opened so as to place the camera 93 in a ready mode and able to take a picture of the breakage of the grinding wheel 56.

The engine 46 is gradually accelerated, and at a certain number of revolutions, the grinding wheel 56 is broken because of the centrifugal force applied thereto.

At the beginning of the breakage of the grinding wheel 56, a first radial crack is propagated from the center of the wheel toward the circumferential portion, and then second and third cracks are produced, that is, the grinding wheel 56 is separated generally into three pieces. When the first radial crack 56 is produced, the electrical wave from the vibrator 63 is terminated since the conductor 71 wound upon the grinding wheel 56 is broken, and thus, electrical power supply to the vibrator 63 terminates. When the conductor 71 is broken, the output of the receiver 85 is reduced from the level "$\epsilon$" to the level "o" and this output change is further amplified by the amplifier 86. The voltage detector 87 is supplied with the amplified output change to cause the energization of the stroboscope 89 whereby the lamp 90 is lit for a very short moment. Since the shutter of the camera 93 is previously opened, a view of the grinding wheel 56, which is about to be broken, can be photographically captured.

The voltage detector 87 is operable so as to simultaneously deenergize the solenoid 91, close the shutter of the camera 93, and to operate the stroboscope 89. However, the shutter of the camera 93 is closed after the lamp 90 is lit, since the closing of the shutter is delayed a bit because of the mechanical operation of the solenoid 91. However, the closing of the shutter is quick enough so as not to take another picture of sparks upon the same exposure, such sparks being produced upon the broken pieces of the wheel impacting with the second guard 81.

The number of revolutions of the spindle 23, with respect to time, throughout the operation, and the pulse denoting the breakage of the grinding wheel 56, are recorded within the data recorder 96 upon the magnetic tape and within the X-Y recorder 99 upon the paper.

Of course, in the case where the disengageable balancing pieces are employed, the balancing pieces 104 and 105 or 114 are disengaged from the flange 58 instantaneously so as to protect the spindle 23 from damage.

Obviously, many modifications and variations of the present invention are possible in light of the above teachings. It is to be understood, therefore, that within the scope of the appended claims, the present invention may be practiced otherwise than as specifically described herein.

Accordingly, what is claimed as new and desired to be secured by letters patent is:

1. Rotating object breakage test apparatus comprising:
    spindle means for rotatably supporting a spindle upon which a rotating object is mounted;
    driving means operable to rotate said spindle;
    vibrator means operable to change an electric signal when electric power supplied thereto is interrupted;
    a power source for supplying electric power to said vibrator means;
    an electrical conductor mounted upon said rotating object connecting said power source with said vibrator means, said electrical conductor being broken so as to interrupt electric power supply to said vibrator means when the rotating object is broken;
    receiving means for receiving the electrical signal from said vibrator means; and
    detecting means adapted to detect the interruption of the electric signal supplied to said receiving means from said vibrator means.

2. Rotating object breakage test apparatus as set forth in claim 1, wherein said detecting means comprises:
    a speed detector for sensing rotational speed of said spindle;
    voltage detecting means responsive to said receiving means for detecting the interruption of the electric power supply to said vibrator means; and
    recording means responsive to said speed detector and said voltage detecting means to record the rotational speed of said spindle together with a rotating object breakage signal.

3. Rotating object test apparatus as set forth in claim 2, wherein said apparatus further comprises:
    a shelter for enclosing the rotating object so as to provide a dark room therefor;
    a camera located within said shelter and being responsive to said voltage detecting means so as to take a picture of the rotating object when it is broken; and
    lighting means for supplying enough light for said camera to take a picture and being responsive to said voltage detecting means to be operated simultaneously with said camera.

4. Rotating object breakage test apparatus as set forth in claim 1, wherein said spindle means is provided with a gas bearing for supporting said spindle.

5. Rotating object breakage test apparatus as set forth in claim 4, wherein said apparatus further comprises:
    guard means surrounding said rotating object so as to prevent the scattering of broken pieces of said rotating object, said guard means being elastically fixed to a floor.

6. Rotating object breakage test apparatus as set forth in claim 4, wherein said spindle means comprises:
    a sleeve mounted upon said spindle;
    a first flange for mounting the rotating object upon said spindle in cooperation with said sleeve;
    a second flange shiftably mounted between said first flange and said sleeve; and
    balancing means mounted between said second flange and said first flange, said balancing means being disengaged therefrom by centrifugal force which causes the shifting of said second flange when the rotating object is broken.

7. Rotating object breakage test apparatus as set forth in claim 4, wherein said spindle means comprises:
    a sleeve mounted upon said spindle;
    a first flange for mounting the rotating object upon said spindle in cooperation with said sleeve;
    a second flange mounted between said sleeve and said first flange;
    spring means interposed between said second flange and said first flange for shifting said second flange when said rotating object is broken; and
    balancing means disengageably mounted between said second flange and said first flange, said balancing means being disengaged therefrom when the rotating object is broken.

8. Rotating object test apparatus as set forth in claim 4, wherein said apparatus further comprises:

a shelter for enclosing the rotating object so as to provide a dark room therefor;

a camera located within said shelter for taking a picture of the rotating object when it is broken; and lighting means for supplying enough light for said camera to take a picture, said detecting means being able to provide a switching signal to energize said lighting means and to close a shutter of said camera.

9. Rotating object test apparatus as set forth in claim 4, wherein said driving means comprises:

an internal combustion engine; and an intermediate shaft driven by said engine, said intermediate shaft being connected with said spindle to rotate said spindle.

10. Rotating object breakage test apparatus comprising:

spindle means for rotatably supporting a spindle upon which a rotating object is mounted;

driving means operable to rotate said spindle;

vibrator means mounted upon said spindle so as to produce an electric signal only while electric power is supplied thereto;

a power source mounted upon said spindle so as to supply electric power to said vibrator means;

an electrical conductor connecting said vibrator means and said power source, said electrical conductor being mounted upon an outer surface of said rotating object and being broken so as to interrupt the electric power supply from said power source to said vibrator means when the rotating object is broken;

receiving means for receiving the electric signal from said vibrator means; and detecting means adapted to detect the interruption of the electric signal supplied to said receiving means from said vibrator means and to record the exact moment when the rotating object is broken.

* * * * *